United States Patent
Herson et al.

(10) Patent No.: US 7,387,325 B2
(45) Date of Patent: Jun. 17, 2008

(54) SLIDE-OUT GUIDE AND CARRIER

(76) Inventors: William W. Herson, 1253 Canton St., Elkhart, IN (US) 46514-3213; Robert A. Nolen, 14129 McKinley Rd., Mishawaka, IN (US) 46545

( * ) Notice: Subject to any disclaimer, the term of this patent is extended or adjusted under 35 U.S.C. 154(b) by 291 days.

(21) Appl. No.: 11/109,613

(22) Filed: Apr. 19, 2005

(65) Prior Publication Data

US 2006/0232088 A1   Oct. 19, 2006

(51) Int. Cl.
*B60P 3/34* (2006.01)
(52) U.S. Cl. .............................. 296/26.01; 296/26.12; 296/165
(58) Field of Classification Search .............. 296/165, 296/171, 172, 173, 175, 176, 26.13, 26.09, 296/26.01; 52/67
See application file for complete search history.

(56) References Cited

U.S. PATENT DOCUMENTS

| | | | | |
|---|---|---|---|---|
| 2,225,319 A | | 12/1940 | Rollo | 296/23 |
| 2,704,223 A | | 3/1955 | Houdart | 296/26 |
| 2,790,673 A | | 4/1957 | Zur Nieden | 296/23 |
| 3,719,386 A | | 3/1973 | Puckett et al. | 296/26 |
| 3,797,880 A | | 3/1974 | Pezzaglia | 206/26 |
| 4,128,269 A | | 12/1978 | Stewart | 296/23 |
| 5,332,276 A | | 7/1994 | Blodgett, Jr. | 296/26 |
| 5,620,224 A | * | 4/1997 | DiBiagio et al. | 296/26.13 |
| 5,758,918 A | | 6/1998 | Schneider et al. | 296/26 |
| 5,971,471 A | | 10/1999 | Gardner | 296/165 |
| 6,109,683 A | * | 8/2000 | Schneider | 296/171 |
| 6,454,336 B1 | * | 9/2002 | Nye et al. | 296/26.13 |
| 6,494,518 B2 | * | 12/2002 | Kreil et al. | 296/26.01 |
| 6,502,893 B1 | * | 1/2003 | Corliss, Jr. | 296/162 |
| 6,619,713 B2 | * | 9/2003 | Eichhorn | 296/26.01 |
| 6,619,714 B2 | * | 9/2003 | Schneider et al. | 296/26.13 |
| 6,796,590 B2 | * | 9/2004 | Schneider | 296/26.13 |
| 6,871,897 B1 | * | 3/2005 | Snyder | 296/26.13 |
| 6,948,754 B2 | * | 9/2005 | Huffman et al. | 296/26.13 |
| 2002/0093213 A1 | * | 7/2002 | Kreil et al. | 296/26.01 |
| 2002/0109368 A1 | | 8/2002 | Mink et al. | 296/26.13 |
| 2002/0180232 A1 | * | 12/2002 | Schneider et al. | 296/26.01 |
| 2005/0184546 A1 | * | 8/2005 | Kunz et al. | 296/26.01 |
| 2006/0273606 A1 | * | 12/2006 | Rasmussen | 296/26.13 |

* cited by examiner

*Primary Examiner*—Jason S Morrow
(74) *Attorney, Agent, or Firm*—Henneman & Associates, PLC; Larry E. Henneman, Jr.

(57) ABSTRACT

A slide assembly is provided to couple a slide-out component disposed in an opening of a vehicle body to the vehicle body. The slide assembly includes a complementary contoured guide member, roller(s), and a support member, all generally enclosed by a mountable housing. The support member and roller(s) are coupled to roll along the guide member. In a particular embodiment, rollers are mounted in pairs on the top and bottom sides of the guide member. Due to the complementary contours of the roller and guide member, the slide assembly has a self-aligning characteristic. In one embodiment, the guide member includes a single portion that is horizontal with respect to the vehicle body, and only allows movement of the slide-out component in a horizontal direction. In another embodiment, the guide member includes multiple sections, each section having a portion that is horizontal with respect to the vehicle body and a portion that is inclined with respect to the vehicle body, thus allowing movement of the slide-out horizontally and vertically with respect to the vehicle body.

51 Claims, 10 Drawing Sheets

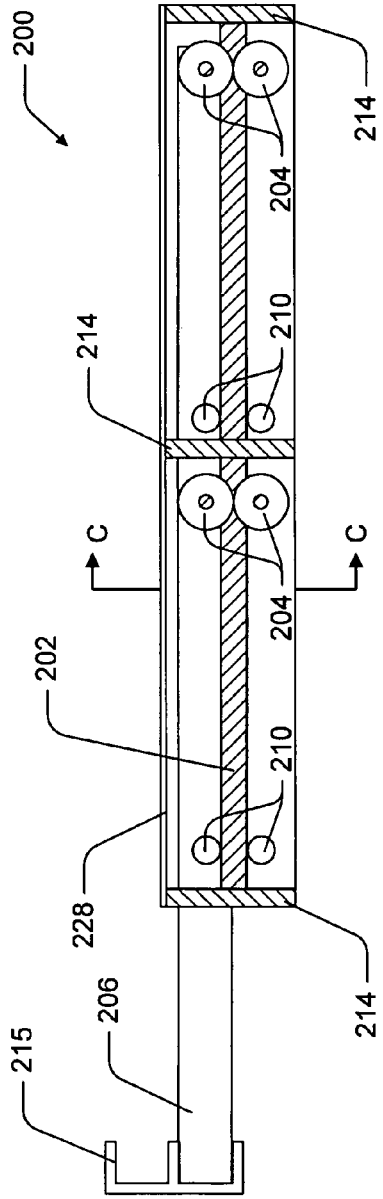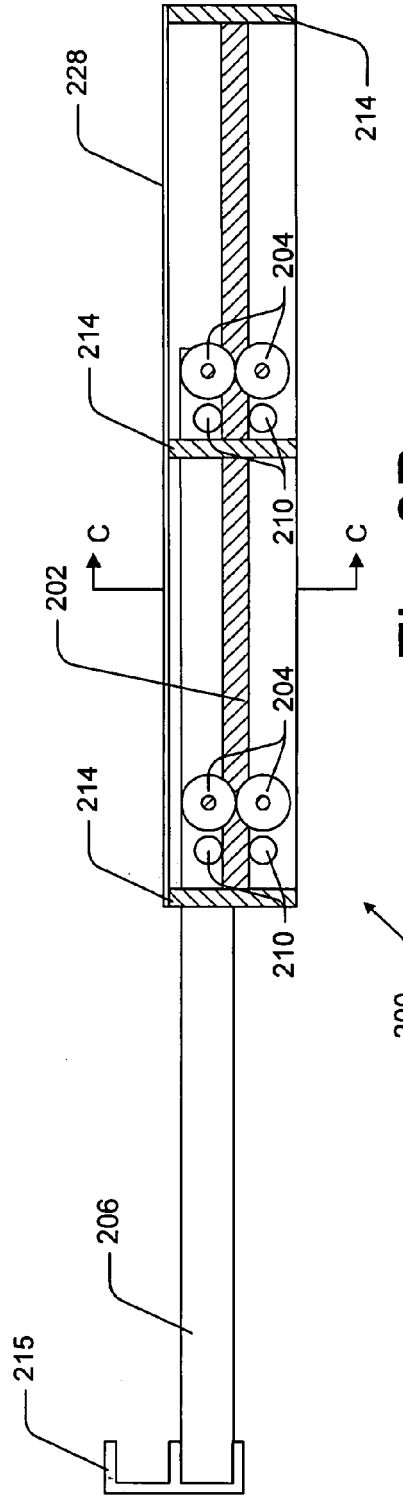

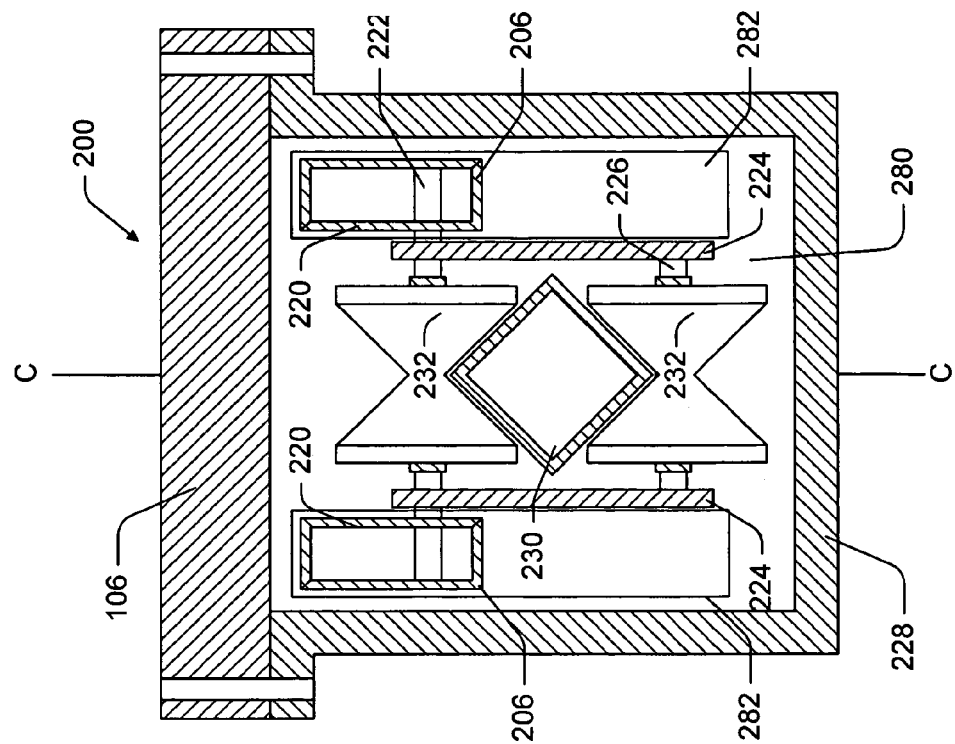
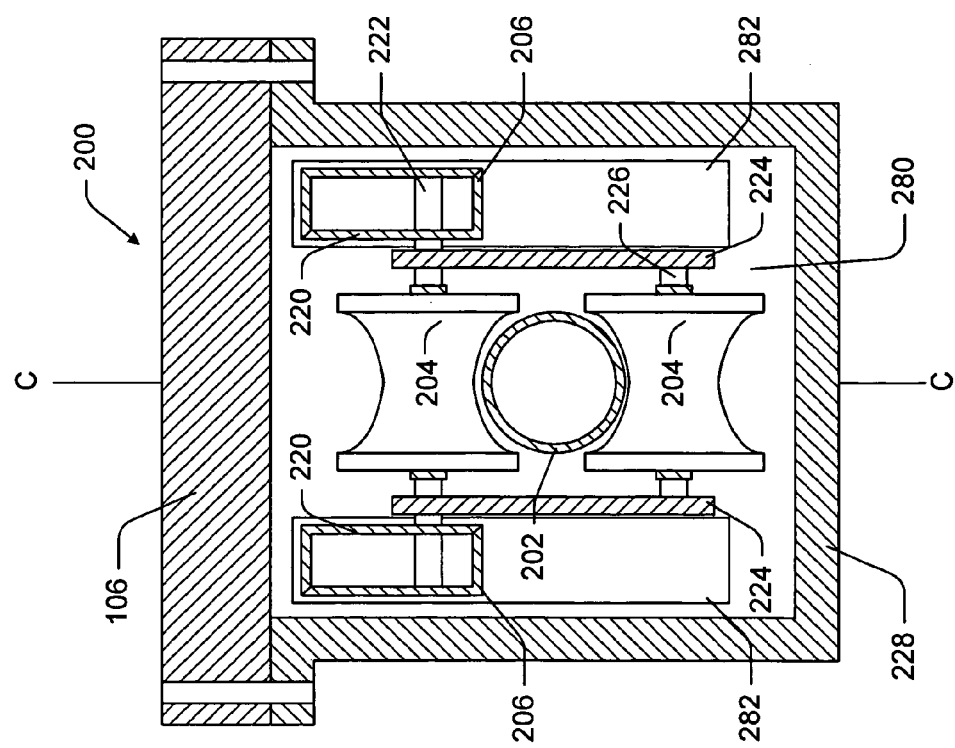
Fig. 4A
Fig. 4B

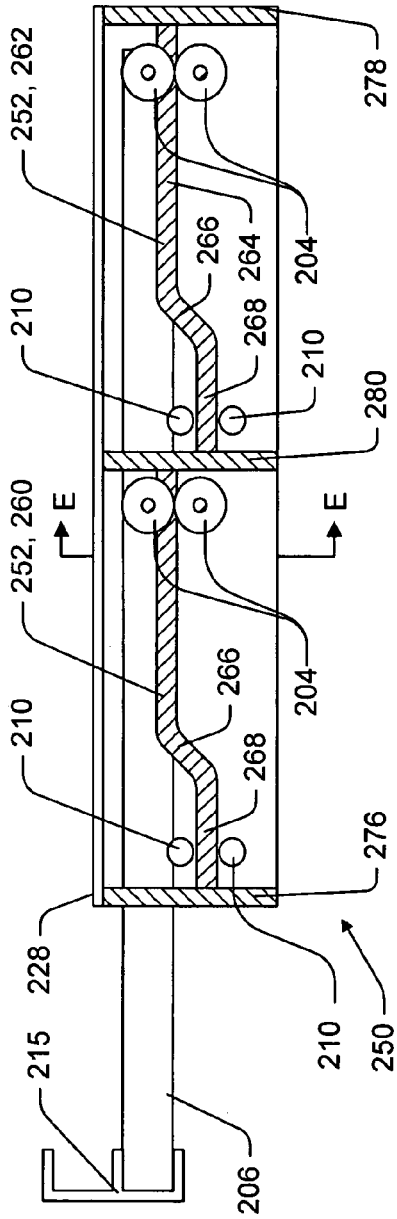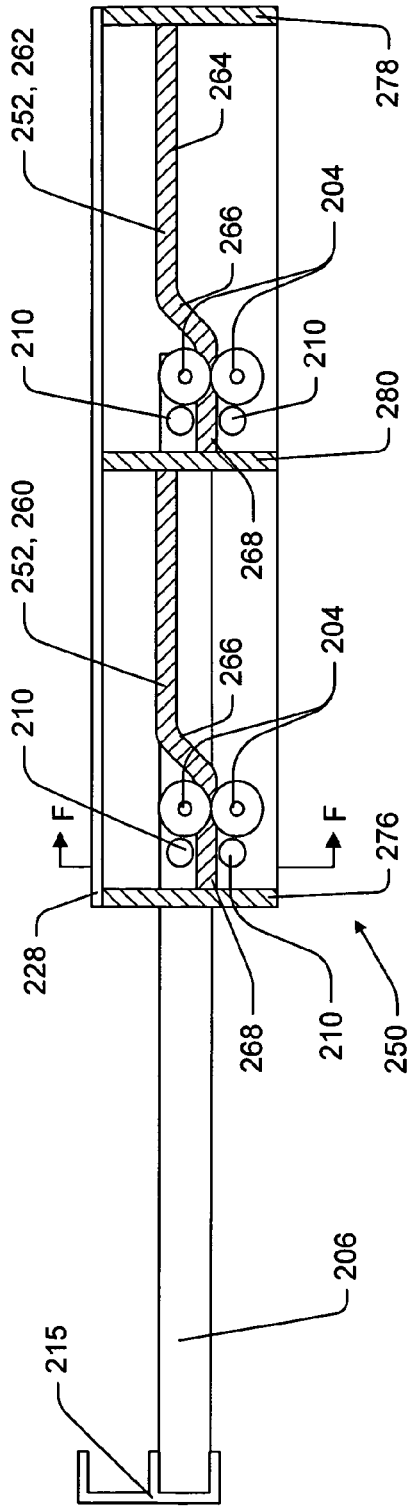
Fig. 6A
Fig. 6B

SLIDE-OUT GUIDE AND CARRIER

BACKGROUND OF THE INVENTION

1. Field of the Invention

This invention relates generally to vehicle slide-out mechanisms, and more particularly to slide-out mechanisms for recreational vehicles. Even more particularly, the invention relates to slide-out mechanisms for room expanders, storage trays, tank carriers, and so on, used in recreational and/or utility vehicles.

2. Description of the Background Art

Room expanders, storage trays, tank carriers, and so on are widely used in recreational and/or utility vehicles as a means to expand useable interior space, and allow access to stored items such as batteries, generators, and LP gas bottles. Known slide-out mechanisms use various types and combinations of rails, tubes, wheels, rollers, guides, skid plates, and so on, to facilitate the expansion and contraction of the slide-out. When assembled, these components are collectively referred to as the slide assembly.

One problem often encountered with known slide assemblies is that alignment of the components that move relative to one another can be difficult to set, adjust, and maintain. Users must adjust the slide-out alignment to ensure it is correct, and also maintain this correct alignment when operating the slide-out, to allow the slide-out to properly deploy and be returned to the stowed position. If correct alignment of the slide-out is not maintained, the slide-out will not operate correctly, and may become jammed and/or damaged.

Another problem with some known slide assemblies is that wheels of the assembly often roll over the floor of the vehicle, and encounter large amounts of rolling resistance due to floor coverings such as carpet. Additionally, due to the large amounts of rolling resistance present, it may be difficult for an individual to operate the slide-out without some form of assistance. Further, even if the resistance is not sufficient to hinder the operation of the slide out, the rollers cause undesirable wear on the floor.

Another common problem encountered by known slide assemblies is that they require a substantial amount of maintenance, such as lubrication and replacement of worn components, in order to operate correctly. For example, in some assemblies a support frame of the slide-out simply slides over a skid plate. Such components require lubrication, and even when properly lubricated are prone to excessive wear. Some maintenance requires the assistance of a trained professional, further adding to the expense of maintenance and repair. Additionally, because many slide assemblies are mounted externally to the vehicle, they are highly susceptible to the elements. For example, if dirt or debris get in the roller tracks it can greatly diminish the operating life and efficiency of the slide assembly. Therefore, known slide assemblies require frequent cleaning and lubrication to avoid excess wear and/or damage.

What is needed, therefore, is a slide assembly that is self-aligning. What is also needed is a slide assembly that is easy to operate. What is also needed is a slide assembly that requires less maintenance than known slide assemblies. What is also needed is a slide assembly that with a greater operating life than known slide assemblies.

SUMMARY

The present invention overcomes the problems associated with the prior art by providing a slide-out guide and carrier system that is self-aligning, easy to operate, and requires relatively low maintenance. The invention facilitates ease of use with a complementary contoured guide and roller system that self-aligns, offers reduced resistance, and greatly reduces the need for adjustment and lubrication.

In one embodiment, a vehicle includes a body, a slide-out component (e.g., a room expander, a storage tank carrier, a storage tray, etc.), and a slide assembly. The slide-out component is disposed in an opening of the vehicle body, and is coupled to the vehicle body by a slide assembly. The slide assembly includes at least one contoured guide member and at least one contoured (e.g., concave, v-shaped, etc.) roller. The guide member is attached to one of the slide-out component and the body, and the roller is attached to the other of the slide-out component and the body, to facilitate relative movement between the slide-out component and the body as the roller rolls along the guide member.

In the embodiments shown, the guide member is fixed with respect to the vehicle body. The roller is mounted to a support member that is coupled to carry the slide-out component. The support member includes two elongated members spaced apart from one another and having the roller(s) mounted there between. As the slide-out component moves in and out of the opening in the vehicle body, the roller(s) and support member assembly travels along the guide member. Alternatively, the roller(s) can be fixed with respect to the vehicle body, and the guide member can be coupled to the slide-out component.

In one particular embodiment, the guide member is straight, thereby facilitating horizontal movement of the roller and support member assembly with respect to the vehicle body. In another particular embodiment, the guide member has at least one portion that is inclined with respect to the vehicle body to facilitate both horizontal and vertical movement of the roller and support member assembly with respect to the vehicle body. Allowing the slide-out component to move vertically facilitates leveling the floor of the slide-out component with the floor of the host vehicle.

In the particular embodiments shown, the guide members are tubular. In one embodiment, the tube has a generally elliptical cross-section (e.g., a round tube). In another embodiment, the tube is rectangular. In either case, the contour of the roller is complementary to the contour of the tube. The embodiments shown utilize a plurality of rollers. The rollers are positioned in pairs, one roller on the top side of the guide member and one roller on the bottom side of the guide member. The paired complementary contoured rollers prevent disengagement from the guide member.

The guide member can include one or more sections. In one embodiment, each guide member is a single straight tube. In another embodiment, each guide member includes two sections, each section having at least one straight portion and at least one inclined portion.

The guide member(s) are fixed to the body of the vehicle via mounts. In one embodiment, the slide assembly includes a first end mount for securing the first end of the guide member to the body and a second end mount for securing the second end of the guide member to the body. The first end mount defines a passage for the support member carrying the slide-out component.

Optionally, the slide assembly includes an intermediate mount disposed between said first end mount and said second end mount, for supporting an intermediate section of the guide member. The intermediate mount also facilitates the passage of the support member. In embodiments with a single, straight guide member, the guide member passes through the intermediate mount. In embodiments with a sectioned guide member, ends of each section can be mounted to the intermediate mount.

In the embodiments shown, the mounts are formed as walls of a housing, including a first end wall, a second end wall, and an intermediate wall. The end walls, together with a bottom wall, side walls, and a portion of the body generally surround the guide members and the rollers. Thus, in addition to providing a means for mounting the slide assembly, the slide assembly is somewhat protected from the elements.

An optional assist device makes deployment and stowage of the slide-out component even easier. This assist may be powered (e.g., electromechanical, hydraulic, etc.) or non-powered (e.g., mechanical, a spring,). Depending on the particular application, the assist may facilitate deployment, stowage, or both deployment and stowage of the slide-out.

BRIEF DESCRIPTION OF THE DRAWINGS

The present invention is described with reference to the following drawings, wherein like reference numbers denote substantially similar elements:

FIG. 3A is a side plan view of the slide assembly shown in FIG. 2A;

FIG. 3B is a side plan view of the slide assembly shown in FIG. 2B;

FIG. 4A is a cross-sectional view taken along line C-C of the slide assembly of FIG. 3A;

FIG. 4B is a cross-sectional view of an alternate slide assembly with a rectangular guide member and complementary contoured roller taken from the same perspective as FIG. 4A;

FIG. 6A is a side plan view of the stowed slide assembly shown in FIG. 5A;

FIG. 6B is a side plan view the deployed slide assembly shown in FIG. 5B;

DETAILED DESCRIPTION

The present invention overcomes the problems associated with the prior art, by providing a slide assembly that is self-aligning, has low resistance to movement, and requires relatively low maintenance. In the following description, numerous specific details are set forth (e.g., number and placement of rollers, construction materials, etc.) in order to provide a thorough understanding of the invention. Those skilled in the art will recognize, however, that the invention may be practiced apart from these specific details. In other instances, details of well known slide-out components and assembly methods have been omitted, so as not to unnecessarily obscure the present invention.

Figure 1A:
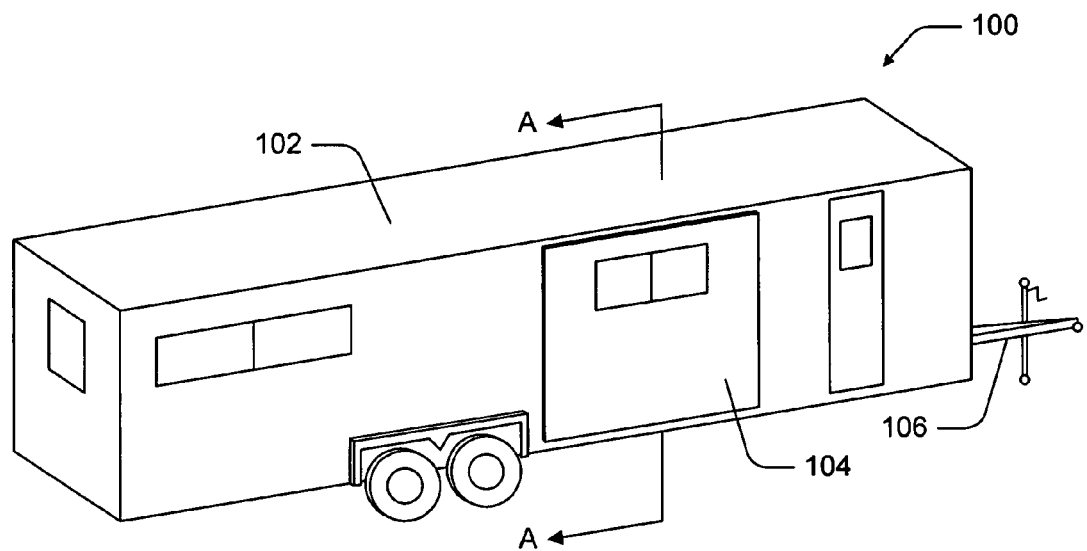
FIG. 1A is a perspective view of a recreational vehicle with a slide-out in a stowed position.

FIG. 1A shows a recreational vehicle 100, including a vehicle body 102, a slide-out component 104 (a room expander in this example), and a vehicle frame 106. Vehicle body 102 is mounted to vehicle frame 106, and has an opening in which slide-out component 104 is disposed. The stowed position of the slide-out component 104 shown in FIG. 1A facilitates easy transportation and/or storage of vehicle 100. In particular, stowing slide-out component 104 keeps the overall width of vehicle 100 within the legal limits for public streets and roads. Also, when slide-out component 104 is stowed, less storage space is required.

Figure 1B:
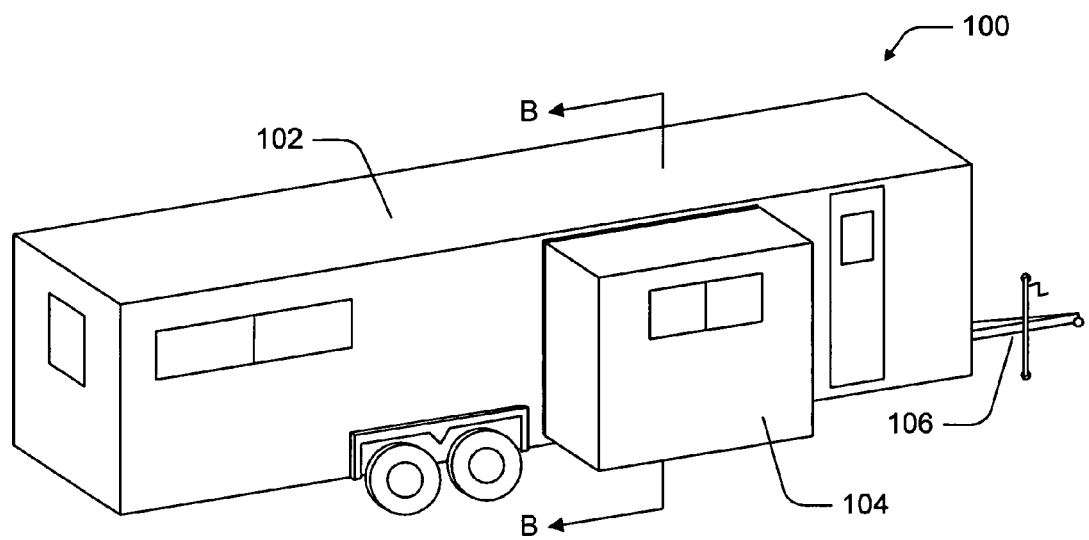
FIG. 1B is a perspective view of the recreational vehicle of FIG. 1A with the slide-out in a deployed position.

FIG. 1B shows recreational vehicle 100 with slide-out component 104 in a deployed position. When deployed, slide-out component 104 provides additional interior space within vehicle 100, which is an advantage when vehicle 100 is actually in use.

Slide-out component 104 is movably mounted to body 102 and/or frame 106 of vehicle 100 by a slide assembly, which is not visible in the view of FIG. 1A. A user moves slide-out component 104 from the stowed position (FIG. 1A) to the deployed position (FIG. 1B) by pulling slide-out component 104 out through the opening in vehicle body 102. The user can later return slide-out component 104 to the stowed position by pushing slide-out component 104 back into vehicle 100 through the opening in vehicle body 102.

Figure 2A:
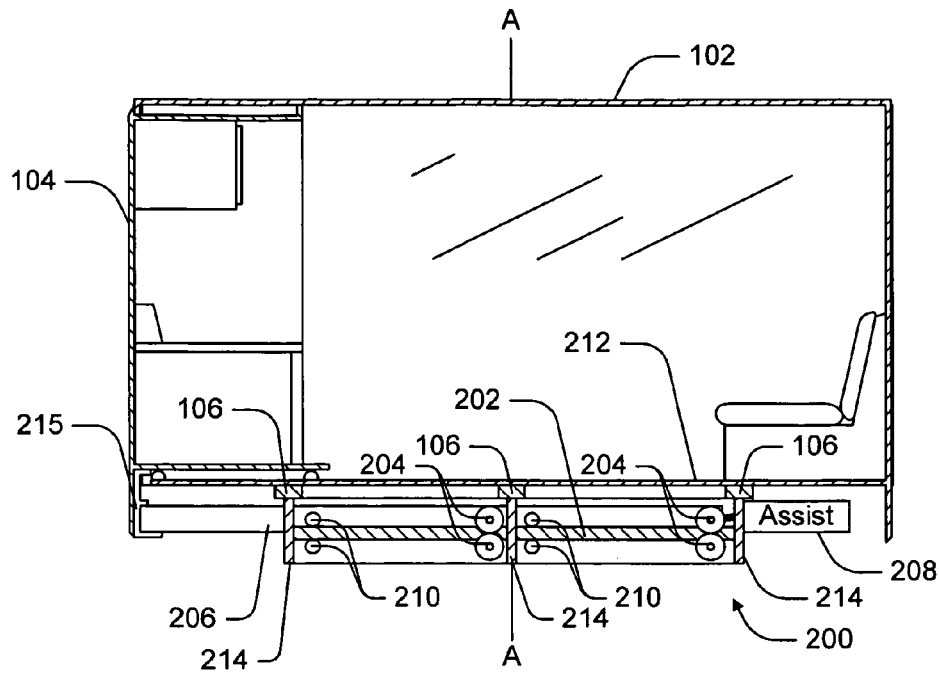
FIG. 2A is a cross-sectional view of the recreational vehicle of FIG. 1A taken along line A-A.

FIG. 2A is a cross-sectional view of recreational vehicle 100 taken along line A-A of FIG. 1A, showing a slide assembly 200 that couples slide-out component 104 to vehicle body 102. Slide assembly 200 includes a guide member 202, a plurality of rollers 204, a support member 206, an assist 208, and a plurality of stoppers 210, and is mounted to the underside of frame 106 by a plurality of mounts 214.

Slide-out component 104 is shown in the stowed position in the opening of vehicle body 102, and is coupled to and at least partially supported by an end portion of support member 206 via a bracket 215. Rollers 204 are rotatably mounted to support member 206 and engage and are supported by guide member 202. Guide member 202 is rigidly fastened to mounts 214. Thus, slide-out component 104 is coupled to vehicle body 102 via slide assembly 200.

Figure 2B:
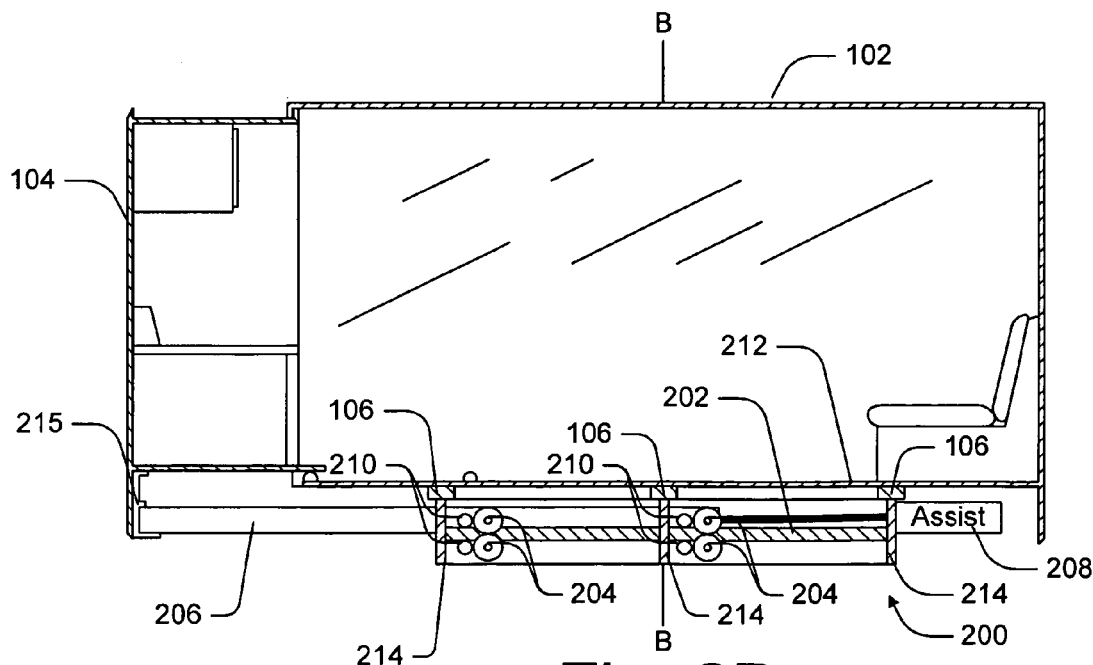
FIG. 2B is a cross-sectional view of the recreational vehicle of FIG. 1B taken along B-B.

FIG. 2B is a cross-sectional view of recreational vehicle 100 taken along line B-B of FIG. 1B, showing slide assembly 200 when slide-out component 104 is deployed. As slide-out component 104 moves to the left in FIG. 2B, rollers 204 roll along guide member 202 to a position where rollers 204 abut stoppers 210 when slide-out component 104 is fully deployed. Support member 206 continues to provide support for slide-out component 104 in the deployed position.

Assist 208 aids in moving slide-out component 104 from the stowed to the deployed position and vice versa. Various assist devices are suitable for use with the present invention including, but not limited to, screw drives, cable drives, springs, hydraulic devices, and or electric drives.

FIG. 3A and FIG. 3B are slightly enlarged side views of slide assembly 200 in the stowed and deployed positions, respectively. Apart from scale, slide assembly 200 is depicted substantially the same in FIGS. 2A and 3A, and in FIGS. 2B and 3B. The enlarged views are provided merely for the readers convenience.

FIG. 4A is a cross-sectional view of slide assembly 200 taken along line C-C of FIG. 3A, showing guide member 202, rollers 204, and support member 206 in greater detail. Guide member 202 is a tube with an elliptical (circular in this example) cross section. Rollers 204 are concave, such that the contours of guide member 202 and rollers 204 are complementary. The complementary contours of guide member 202 and rollers 204 result in a centering force when a load is applied to the rollers, thus contributing to the self-alignment feature of the invention. The use of a pair of rollers 204, one above and one below guide member 202 also contributes to the self-alignment of slide assembly 200, and prevents disengagement of rollers 204 from guide member 202 when, for example, the load from slide-out component 104 is exerted on the extended end of support member 206.

FIG. 4A also shows that support member 206 includes two elongated members 220 (cross-section shown) coupled together by a shaft 222. Each elongated member 220 is formed of tubular steel, and is fixed (e.g., bolted, screwed, etc.) to slide-out component 104 via bracket 215 (FIGS. 2A-2B). Although not visible in FIG. 4A, elongated members 220 are also connected by a second shaft 222 at the location of the second pair of rollers 204 (see e.g., FIG. 3A).

Rollers 204 are mounted between support members 206. The top one of rollers 204 is rotatably mounted on shaft 222, and transfers the load of slide-out component 104 to guide member 202 as the rollers 204 travel along guide member 202 during deployment and/or stowage of the slide-out component 104. The bottom roller 204 is suspended from shaft 222 by a pair of brackets and is rotatably mounted on a lower shaft 226 extending between the lower ends of brackets 224. Brackets 224 swing freely about upper shaft 222, thereby allowing the roller assembly to traverse alternate guide members that are not straight, as will be described in greater detail below. Alternatively, where no such movement is required, brackets 224 can be rigidly fastened to elongated members 220 (e.g., welded, bolted, etc.) and shaft 222 can be shortened and mounted directly between brackets 224 as shown, for example, in FIG. 10B.

The assembly of rollers 204 and support member 206 are enclosed by mountable housing shell 228, which is rigidly attached to frame 106. Alternatively, housing shell 228 can be mounted to a structure other than frame 106 (e.g., directly to the floor 212 of vehicle body 102). As will be described in greater detail below, in this particular embodiment mounts 214 are be incorporated into the walls of housing 228.

FIG. 4B is a cross-sectional view of an alternate slide assembly 400. Slide assembly 400 is substantially similar to slide assembly 200, except that alternate slide assembly 400 includes an alternate tubular guide member 230 with a rectangular cross section, and alternate v-shaped rollers 232. The complementary contours of guide member 230 and rollers 232 cause slide assembly 400 to be self-centering, similar to slide assembly 200. In particular, when a downward load is applied to upper roller 232, any lateral displacement of roller 232 will result in a force being applied to the surface of roller 232 by guide member 230, which will urge roller 232 back toward its centered position. Indeed, various other contours of guide members and rollers could be used without departing from the scope of the present invention. For example, a guide member with concave grooves could be used in conjunction with convex rollers. What is important to the self-aligning aspect of the invention is that any lateral displacement results in a force that urges the roller back into centered alignment with the guide member.

Figure 5A:
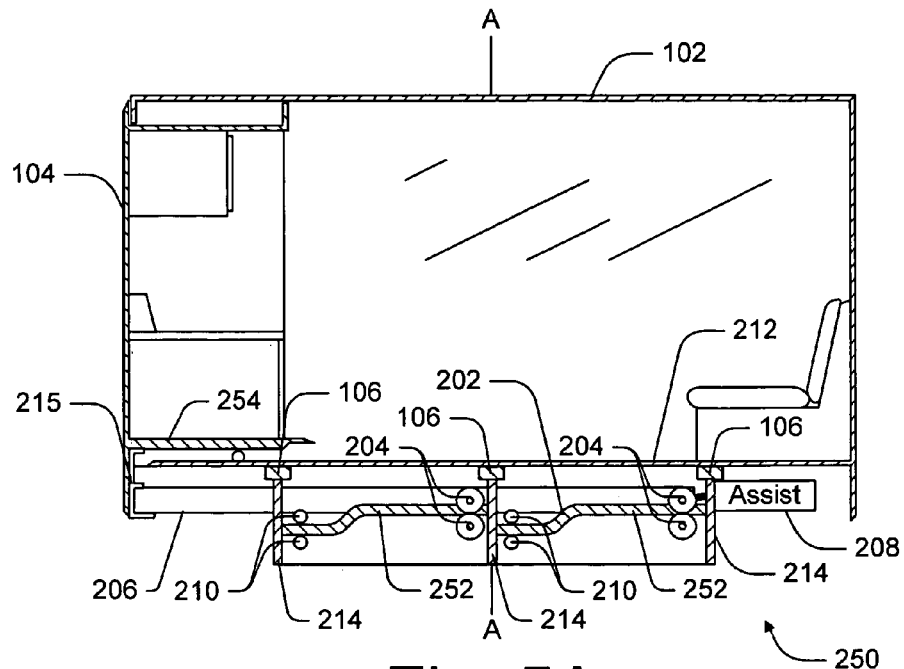
FIG. 5A is a cross-sectional view of a recreational vehicle including a leveling slide assembly in a stowed position taken from the same perspective as along line A-A of FIG. 1A.

FIG. 5A is a cross-sectional view of recreational vehicle 100 taken along line A-A of FIG. 1A, showing vehicle 100 with an alternate slide assembly 250. Alternate slide assembly 250 is similar to slide assembly 200 except that an alternate guide member 252 facilitates the leveling of the floor 254 of slide-out component 104 with the floor 212 of vehicle 100. Note that in the stowed position the floor 254 of slide-out component 104 is slightly higher than the floor 212 of vehicle 100.

Figure 5B:
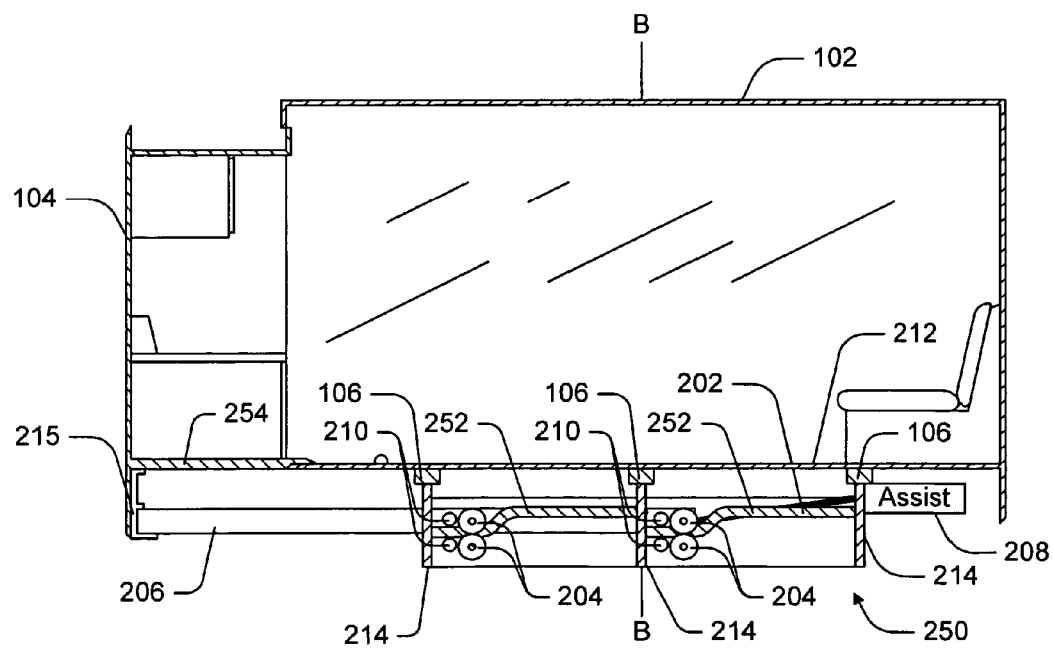
FIG. 5B is a cross-sectional view of a recreational vehicle including the leveling slide assembly in a deployed position taken from the same perspective as along B-B of FIG. 1B.

FIG. 5B shows the same view as FIG. 5A, except that slide-out component 104 is in the deployed position. Note that in the deployed position floor 212 of vehicle 100 and floor 254 of slide-out component 104 are at the same level. Note also that slide assembly 250 is presented for illustrative purposes. The exact path of guide member 252 would of course depend on the details of the particular slide-out application. The point here is that the roller assemblies of the present invention can be combined with nonlinear guide members. Indeed, such combinations are considered to be an aspect of the present invention.

FIG. 6A shows an enlarged view of alternate slide assembly 250 in the stowed position. Guide member 252 is shown to include a first section 260 and a second section 262. Each of sections 260 and 262 include an upper horizontal section 264, an inclined section 266, and a lower horizontal section 268. The upper horizontal sections 264 define a path of travel when slide-out component 104 is initially traveling over the floor 212 (FIG. 5A), and extends a distance sufficient for slide-out component to clear the edge of floor 212. Inclined portions 266 provide a transition between upper horizontal portions 264 and lower horizontal portions 268, which define the height of slide-out component 104 in the deployed position. Recall, that brackets 224 swing freely on shaft 222, thus allowing rollers 204 to navigate the bends in guide member 252 between inclined sections 266 and horizontal sections 264 and 268.

In this particular embodiment, walls of housing 228 serve as mounts for alternate guide member 252. In particular, housing 228 includes a front end wall 276, a rear end wall 278, and an intermediate wall 280. First section 260 of guide member 252 is mounted by fixing one end to front wall 276 and the other end to intermediate wall 280. Second section 262 of guide member 252 is mounted by fixing one end to intermediate wall 280 and the other end to rear end wall 278.

FIG. 6B shows the same view as FIG. 6A, except that slide-out component 104 is in the deployed position. Support member 206 remains level, but is lower in the deployed position than in the stowed position. This facilitates the leveling of floor 254 of slide-out component 104 with floor 212 of vehicle 100, as described above with reference to FIGS. 5A and 5B.

It is not necessary that support member 206 remain level in order to level the floors 212 and 254. For example, substituting a straight section for second section 262 of guide member 252 would result in support member 206 being in an inclined position when fully deployed Such an alternate embodiment would reduce the amount of horizontal offset required in first section 260 of guide member 252, but would require at least some flexibility in the connection between support member 206 and slide-out component 104 to keep component 104 level while support member 206 is inclined.

Figure 7B:
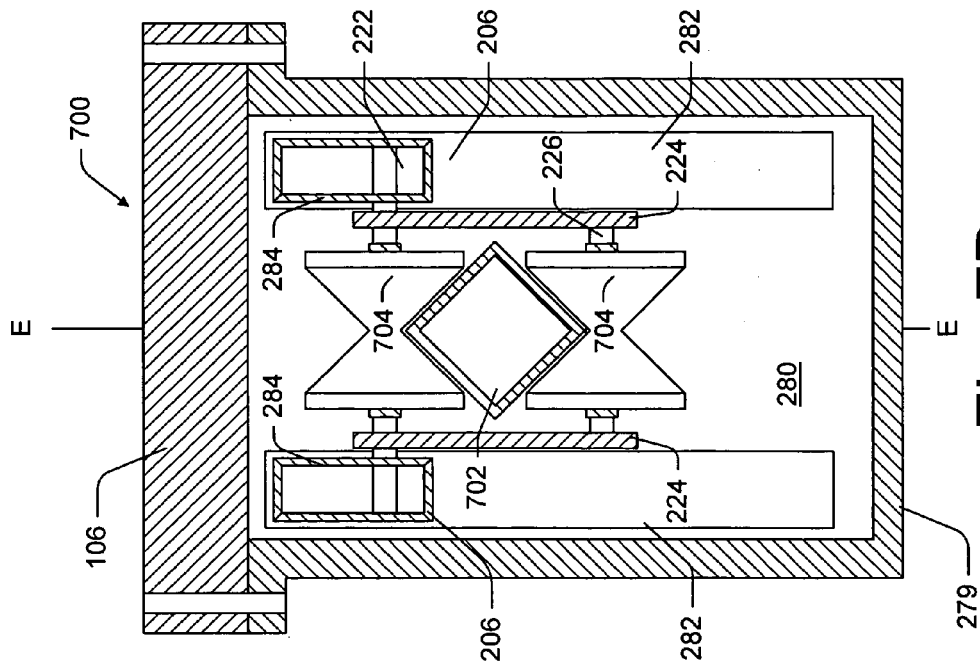
FIG. 7B is a cross-sectional view of an alternate leveling slide assembly in a stowed position.
Figure 7A:
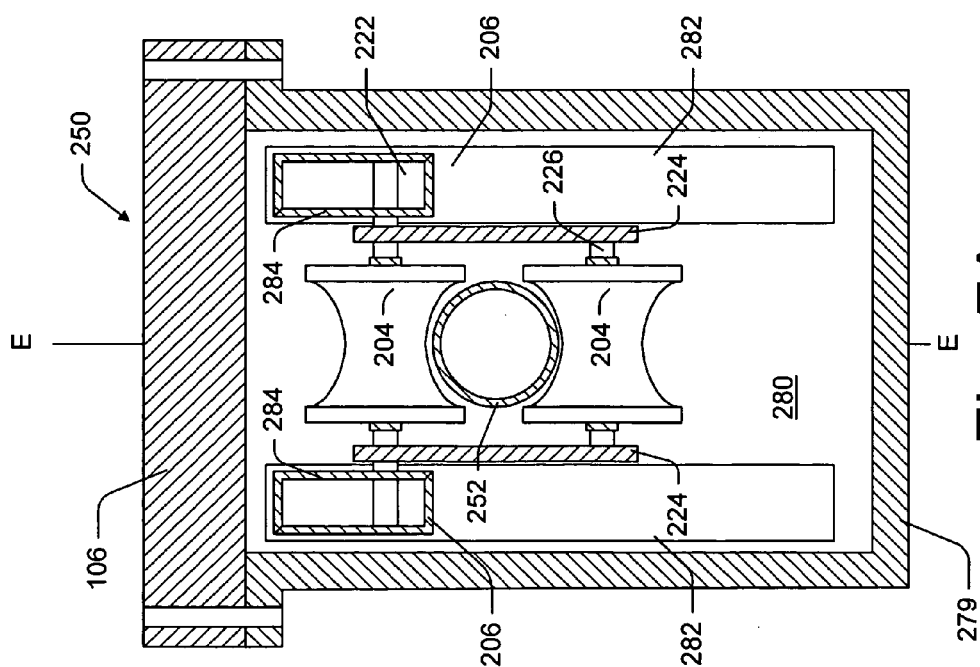
FIG. 7A is a cross-sectional view of the slide assembly of FIG. 6A taken along line E-E.

FIG. 7A shows a cross-sectional view of slide assembly 250 taken along line E-E of FIG. 6A. The assembly including rollers 204, brackets 224, and shafts 222 and 226 is substantially the same as in the embodiment of FIG. 4A. However, slide assembly 250 includes an alternate housing 279 that is taller than housing 228 of the previously described embodiments. The extra height of housing 279 accommodates the vertical travel of rollers 204 and support member 206.

As in the embodiment of FIG. 4A, the slide assembly mounts are incorporated into housing 279. For example, as shown in FIG. 7A, intermediate mount 280 forms an intermediate wall 280 of housing 279. Intermediate wall/mount 280 defines a pair of rectangular apertures 282 that facilitate the passage of elongated members 284, while at the same time provide a mounting surface for first 260 and second 262 sections of guide member 252. Similarly, a front wall of housing 279 (not visible in FIG. 8A) includes a pair of apertures to facilitate the passage of elongated members 284.

FIG. 7B shows a cross-section of an alternate slide assembly 700. Slide assembly 700 is similar to slide assembly 250, except that slide assembly 700 includes an alternate guide member 702 that has a rectangular cross section. Furthermore, slide assembly 700 includes alternate v-shaped rollers 704. The complementary contours of guide member 702 and rollers 704 cause slide assembly 700 to be self-centering, similar to slide assemblies 200 and 250. In particular, when a downward load is applied to upper roller 704, any lateral displacement of roller 704 will result in a force being applied to the surface of roller 704 by guide member 702, which will urge roller 704 back toward its centered position. Although not visible in the view of FIG. 7B, it should be understood that alternate guide member 702 follows a path similar to guide member 252, including horizontal sections disposed at different heights and joined by one or more inclined sections.

Figure 8B:
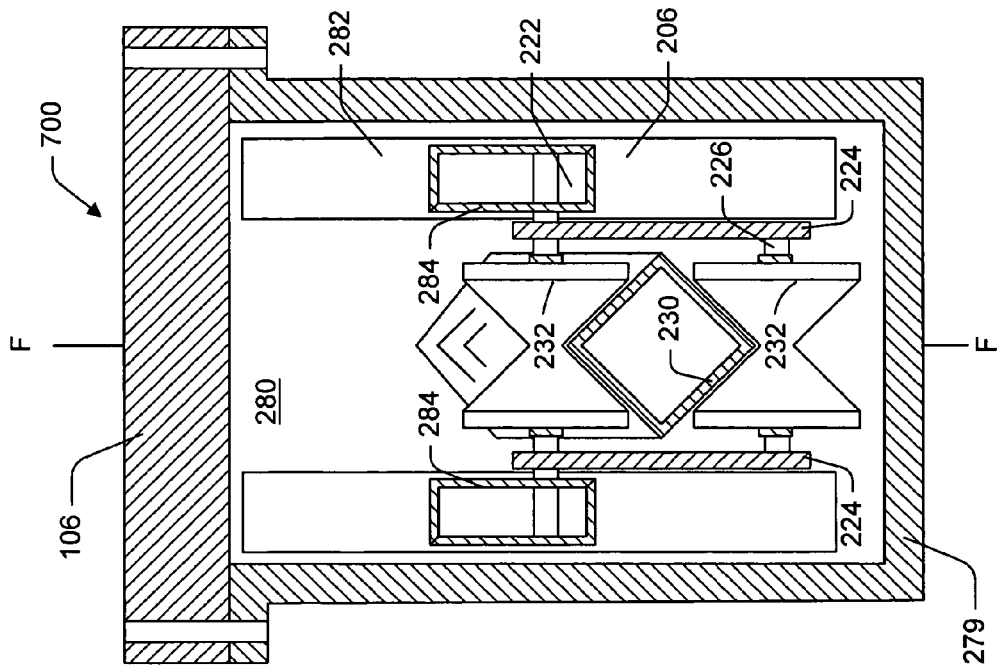
FIG. 8B is a cross-sectional view of the alternative slide assembly of FIG. 7B in a deployed position, taken along the same line F-F as FIG. 8A.
Figure 8A:
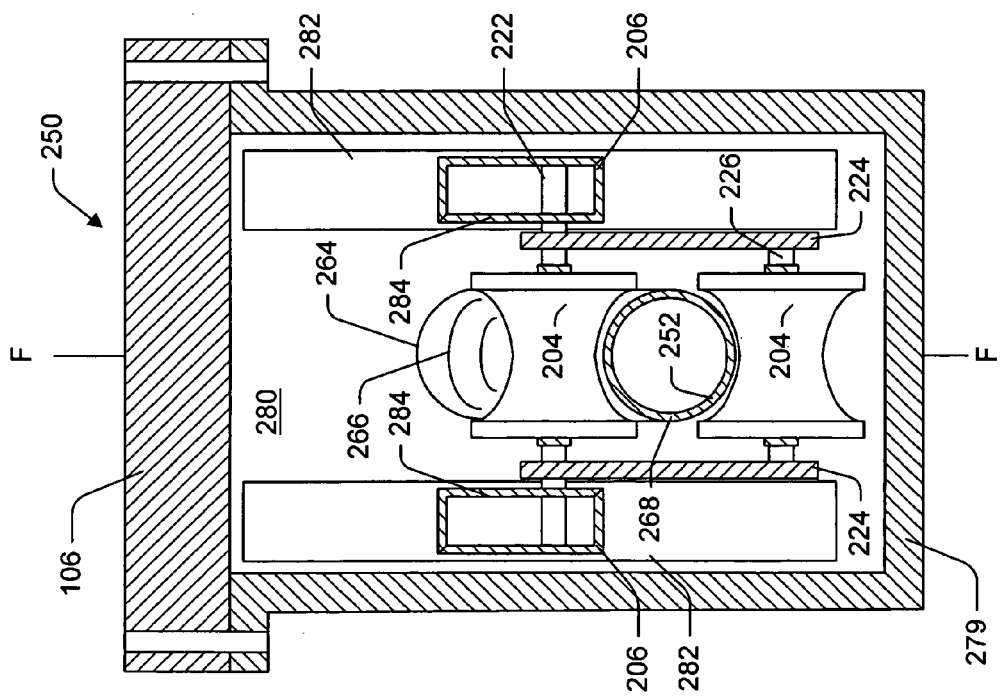
FIG. 8A is a cross-sectional view of the slide assembly of FIG. 6B taken along line F-F.

FIG. 8A shows a cross-sectional view of slide assembly 250 taken along line E-E of FIG. 6A. The view of FIG. 8A is similar to the view of FIG. 7A, except that in this deployed position rollers 204 are engaging lower horizontal portion 268 of guide member 252 instead of upper horizontal portion 264. The surface of inclined portion 266 is visible rising up from behind upper roller 204.

In the deployed position, elongated members 282 of support member 206 are positioned vertically in approximately the center of openings 282 of intermediate wall 280. Because this is the lowest position of support member 206, openings 282 need not extend down as far as shown in FIG. 8A. One advantage, however, of forming openings 282 to extend nearly the entire height of intermediate wall 280, is that intermediate wall 280 can accommodate alternate elongated members having greater vertical dimensions, as might be necessary depending on the intended load. On the other hand, limiting the size of openings 282 would increase the strength of intermediate wall 280. Thus, determining the best dimensions of openings 282 involves design trade-offs including, but not limited to, material choice, component interchangeability, and load requirements. All such design variations are considered to be within the scope of the present invention.

FIG. 8B shows a cross-sectional view of alternate slide assembly 700 from the same perspective as the view of FIG. 8A. As indicated above, the primary difference between slide assembly 700 and slide assembly 250 is the contours of guide member 230 and rollers 232.

Figure 9A:
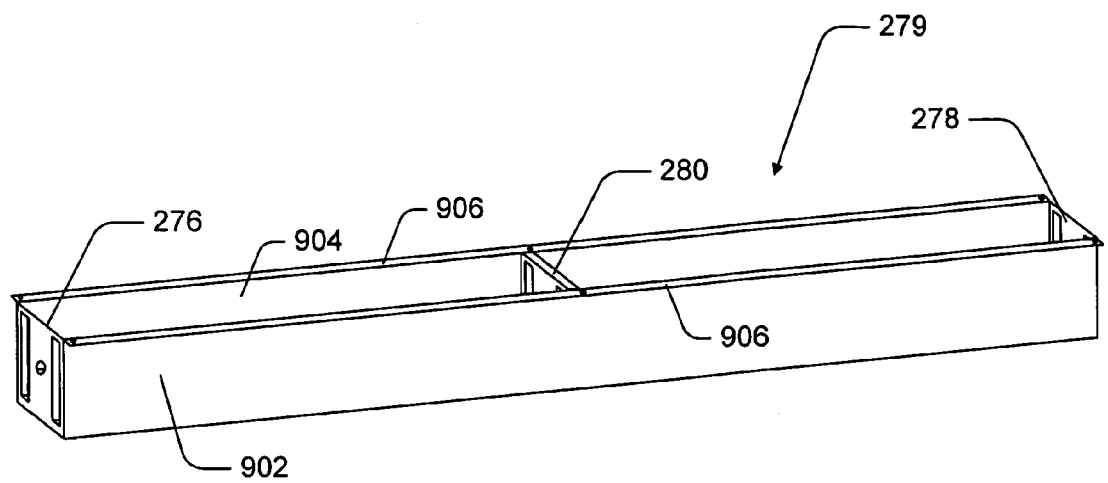
FIG. 9A is a perspective view of a combination housing and mounting system for a slide-assembly.
Figure 9B:
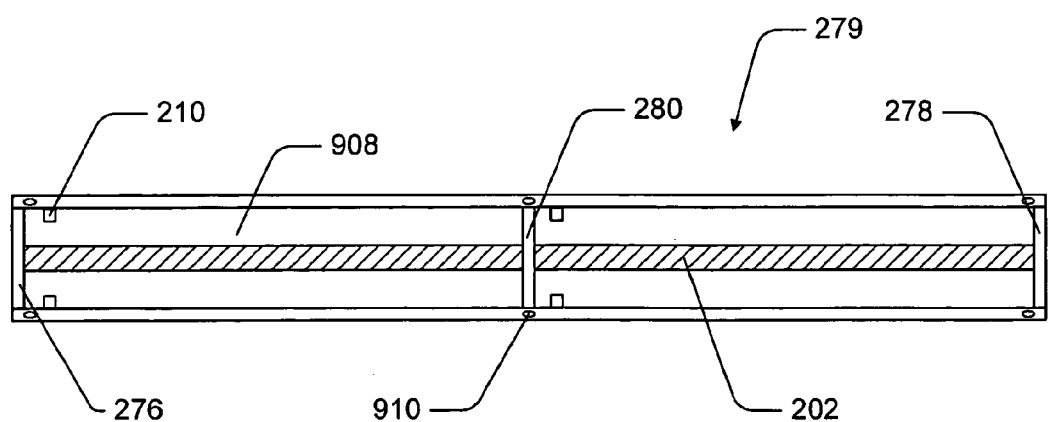
FIG. 9B is a top plan view of the housing and mounting system of FIG. 9A.

FIG. 9A is a perspective view showing housing/mount 279 to include front end wall 276, rear end wall 278, intermediate wall 280, side walls 902, 904, a mounting lip 906, and a bottom 908 (FIG. 9B). In this particular embodiment, side walls 902, 904 mounting lip 906, and bottom 908 are formed by bending a single sheet of 14 gauge steel. Front end wall 276, rear end wall 278, and intermediate wall 280 are formed from 11 gauge steel. Although openings to facilitate the passage of a support member are not required in rear wall 278, it should be noted that in the embodiment shown, front end wall 276, rear end wall 278, and intermediate wall 280 are all identical. This reduces the number of different parts required for manufacture of housing 279.

Front end wall 276 and rear end wall 278 are rigidly attached (e.g., welded) to opposite ends of side walls 902, 904 and bottom 908. Intermediate wall 280 is rigidly attached to side walls 902, 904 and bottom 908 at a point between first end wall 276 and second end wall 278.

Although not shown in the drawings, side walls 902, 904 and/or bottom 908 can include openings and/or structures for mounting additional optional features. For example, side walls 902, 904 can include facing openings to accept cross supports, such as a bars or tubes to help support the ends of guide member 202 near points of attachment to end walls 276, 278.

FIG. 9B is a top plan view of housing 279. Mountable housing 279 is shown to further include stoppers 210 that, as described above, limit the travel of the assembly of rollers 204, support member 206, and slide-out component 104 along guide member 202. The quantity and placement of stoppers 210 can be changed depending on the particular application.

FIG. 9B also shows mounting lip 906 more clearly to include a plurality (six in this example) of apertures 910, which facilitate the mounting of housing 279 to vehicle body 102, vehicle frame 106, or some other supporting structure. Those skilled in the art should recognize that the quantity and particular placement of mounting apertures 910 will depend on the properties of the structure to which housing 279 is intended to be mounted.

Guide member 202 is also visible in the FIG. 9B. One end of guide member 202 is attached (e.g., welded) to front end wall 276, and the other end is attached to rear end wall 278. In this embodiment (straight guide member) guide member 202 simply passes through an aperture in intermediate wall 280 and is supported thereby. In other embodiments (e.g., sectioned guide members) ends of the guide member sections can be fixed (e.g., welded) to intermediate wall 280.

Figure 10A:
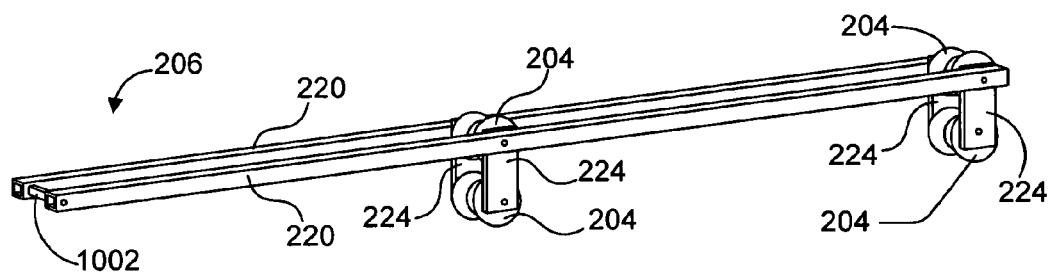
FIG. 10A is a perspective view of the support member of FIG. 2A.

FIG. 10A is a perspective view of the assembly of rollers 204 and support member 206. Rollers 204 are shown to be attached between elongated members 220 of support member 206 by brackets 224. A cross-support 1002 is provided between the ends of elongated members 220 for added stability. This assembly is assembled around guide member 202. Although not shown in the drawings, access openings can be provided in the walls of housing 279 in order to facilitate assembly.

Figure 10B:
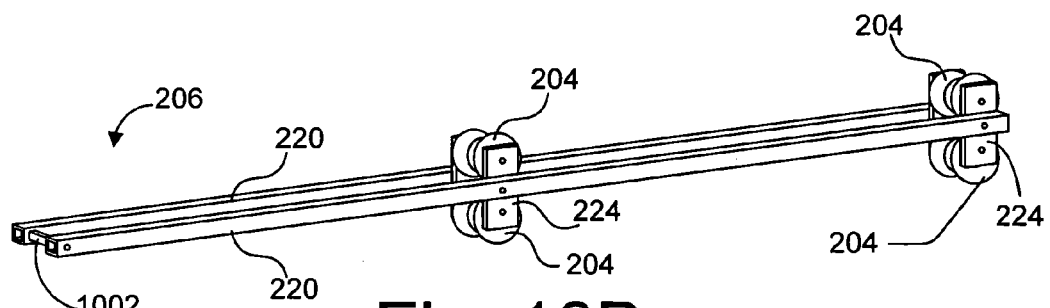
FIG. 10B is a perspective view an alternate support member.

FIG. 10B is a perspective view of a modified embodiment of the assembly of FIG. 10A, where the position of rollers 204 with respect to support member 206 is different. This embodiment is shown to illustrate that the positional relationship between rollers 204 and support member 206 can be altered without deviating from the scope of the present invention.

The description of particular embodiments of the present invention is now complete. Many of the described features may be substituted, altered or omitted without departing from the scope of the invention. For example, alternate guide member and roller shapes may be substituted for those described above. As another example, roller placement and quantity may be changed to suit load, space confinements, or guide member shapes. As yet another example, the guide member may be divided into multiple sections that may or may not include inclined portions. Additionally, depending on the partiuclar application, at least one of mounts 214 can be omitted. Further, a single stopper can be substituted for the plurality of stoppers shown in the described embodiments. These and other deviations from the particular embodiments shown will be apparent to those skilled in the art, particularly in view of the foregoing disclosure.

We claim:

1. A vehicle including:
   a body defining an opening;
   a slide-out component disposed in said opening; and
   a slide assembly coupled between said body and said slide-out component, said slide assembly including
   a contoured guide member coupled to one of said body and said slide-out component, said contoured guide member including a tube having a generally elliptical cross section, and
   a complementary contoured roller coupled to the other of said body and said slide-out component, and disposed to roll on said contoured guide member.

2. A vehicle according to claim 1, wherein said contoured guide member is fixed with respect to said body.

3. A vehicle according to claim 2, wherein:
   said slide assembly further includes a support member coupled to said slide-out component; and
   said roller is mounted to said support member.

4. A vehicle according to claim 3, wherein said slide assembly includes a housing mounted to said vehicle body.

5. A vehicle according to claim 4, wherein:
   said housing includes a first end wall and a second end wall;
   a first end of said contoured guide member is mounted to said first end wall of said housing; and
   a second end of said contoured guide member is mounted to said second end wall of said housing.

6. A vehicle according to claim 5, wherein:
   said housing further includes an intermediate wall disposed between said first end wall and said second end wall.

7. A vehicle according to claim 6, wherein said housing together with a portion of said body generally surrounds said contoured guide member and said roller.

8. A vehicle according to claim 6, wherein said contoured guide member traverses said intermediate wall.

9. A vehicle according to claim 8, wherein:
   said first end wall and said intermediate wall define apertures to facilitate the passage of said support member.

10. A vehicle according to claim 9, wherein:
    said support member includes two separate elongated members spaced apart from one another;
    said rollers are mounted between said elongated members; and
    said first end wall and said intermediate wall define apertures to facilitate the passage of each said elongated member.

11. A vehicle according to claim 8, wherein said contoured guide member passes through an opening in said intermediate wall.

12. A vehicle according to claim 8, wherein:
    said contoured guide member includes a first section and a second section;
    said first section of said contoured guide member includes a first end coupled to said first end wall of said housing and a second end mounted to said intermediate wall of said housing; and
    said second section of said contoured guide member includes a first end mounted to said intermediate wall of said housing and a second end mounted to said second end wall of said housing.

13. A vehicle according to claim 12, wherein each of said first and second sections of said contoured guide member includes a generally horizontal portion and an inclined portion.

14. A vehicle according to claim 4 wherein said vehicle has a plurality of said slide assemblies.

15. A vehicle according to claim 3, wherein said roller is positioned on a top side of said contoured guide member.

16. A vehicle according to claim 15, wherein:
    said slide assembly further comprises a second roller; and
    said second roller is positioned on a bottom side of said contoured guide member,
       said first roller and said second roller forming a roller pair.

17. A vehicle according to claim 16, wherein said slide assembly has a plurality of said roller pairs spaced apart horizontally.

18. A vehicle according to claim 17, wherein said roller pairs are pivotally mounted to said support member.

19. A vehicle according to claim 3, wherein:
    said support member includes two separate elongated members spaced apart from one another; and
    said roller is mounted between said elongated members.

20. A vehicle according to claim 3, wherein said slide assembly further includes:
    a first end mount for securing a first end of said contoured guide member to said body; and
    a second end mount for securing a second end of said contoured guide member to said body.

21. A vehicle according to claim 20, wherein said first end mount defines a passage for said support member.

22. A vehicle according to claim 20, further comprising an intermediate mount disposed between said first end mount and said second end mount for supporting an intermediate section of said contoured guide member.

23. A vehicle according to claim 22, wherein said contoured guide member passes through said intermediate mount.

24. A vehicle according to claim 22, wherein:
    said contoured guide member includes a first section and a second section;
    said first section of said contoured guide member includes a first end coupled to said first end mount and a second end mounted to said intermediate mount; and
    said second section of said contoured guide member includes a first end mounted to said intermediate mount and a second end mounted to said second end mount.

25. A vehicle according to claim 24, wherein each of said first and second sections of said contoured guide member includes a generally horizontal portion and an inclined portion.

26. A vehicle according to claim 22, wherein:
said support member includes two separate elongated members spaced apart from one another;
said roller is mounted between said elongated members; and
said intermediate mount facilitates the passage of said elongated members.

27. A vehicle according to claim 1, wherein said contoured guide member includes a horizontal section disposed horizontally with respect to said vehicle body.

28. A vehicle according to claim 27, wherein said slide-out component moves horizontally with respect to said vehicle body when said roller rolls along said horizontal section of said contoured guide member.

29. A vehicle according to claim 1, wherein:
said contoured guide member includes a horizontal section with respect to said vehicle body; and
said contoured guide member includes an inclined section with respect to said vehicle body.

30. A vehicle according to claim 29, wherein:
said slide-out component moves generally horizontally when said roller rolls along said horizontal section of said contoured guide member; and
said slide out component moves both horizontally and vertically when said roller rolls along said inclined section of said contoured guide member.

31. A vehicle according to claim 1, wherein said roller has a concave contour.

32. A vehicle according to claim 1, wherein said slide assembly further comprises at least one assist device connected to exert a force to urge said slide assembly into at least one of an expanded or contracted position.

33. A vehicle according to claim 32, wherein said assist device includes a biasing member that is deformed during the expansion of said slide assembly and exerts a restoring force upon contraction of said slide assembly.

34. A vehicle according to claim 1, wherein said slide out component is a room expander of a recreational vehicle.

35. A vehicle according to claim 1, wherein said slide out component is a storage tank carrier of a recreational vehicle.

36. A vehicle according to claim 1, wherein said slide out component is a storage tray of a recreational vehicle.

37. A vehicle including:
a body defining an opening;
a slide-out component disposed in said opening; and
a slide assembly coupled between said body and said slide-out component, said slide assembly including
a contoured guide member coupled to and fixed with respect to said body,
a complementary contoured roller coupled to the other of said body and said slide-out component, and disposed to roll on said contoured guide member,
a support member coupled to said slide-out component, said roller being mounted to said support member, and
a housing mounted to said vehicle body, said housing including a first end wall and a second end wall; and wherein
a first, end of said contoured guide member is mounted to said first end wall of said housing; and
a second end of said contoured guide member is mounted to said second end wall of said housing.

38. A vehicle according to claim 37, wherein:
said housing includes a first end wall and a second end wall;
a first end of said contoured guide member is mounted to said first end wall of said housing; and
a second end of said contoured guide member is mounted to said second end wall of said housing.

39. A vehicle according to claim 38, wherein:
said housing further includes an intermediate wall disposed between said first end wall and said second end wall.

40. A vehicle according to claim 39, wherein said housing together with a portion of said body generally surrounds said contoured guide member and said roller.

41. A vehicle according to claim 39, wherein said contoured guide member traverses said intermediate wall.

42. A vehicle according to claim 41, wherein:
said first end wall and said intermediate wall define apertures to facilitate the passage of said support member.

43. A vehicle according to claim 42, wherein:
said support member includes two separate elongated members spaced apart from one another;
said rollers are mounted between said elongated members; and
said first end wall and said intermediate wall define apertures to facilitate the passage of each said elongated member.

44. A vehicle according to claim 41, wherein said contoured guide member passes through an opening in said intermediate wall.

45. A vehicle according to claim 41, wherein:
said contoured guide member includes a first section and a second section;
said first section of said contoured guide member includes a first end coupled to said first end wall of said housing and a second end mounted to said intermediate wall of said housing; and
said second section of said contoured guide member includes a first end mounted to said intermediate wall of said housing and a second end mounted to said second end wall of said housing.

46. A vehicle according to claim 45, wherein each of said first and second sections of said contoured guide member includes a generally horizontal portion and an inclined portion.

47. A vehicle including:
a body defining an opening;
a slide-out component disposed in said opening; and
a slide assembly coupled between said body and said slide-out component, said slide assembly including
a contoured guide member coupled to and fixed with respect to said body,
a complementary contoured roller coupled to the other of said body and said slide-out component, and disposed to roll on said contoured guide member,
a support member coupled to said slide-out component, said roller being mounted to said support member,
a first end mount for securing a first end of said contoured guide member to said body,
a second end mount for securing a second end of said contoured guide member to said body, and
an intermediate mount disposed between said first end mount and said second end mount for supporting an intermediate section of said contoured guide member.

48. A vehicle according to claim 47, wherein said contoured guide member passes through said intermediate mount.

49. A vehicle according to claim 47, wherein:
said contoured guide member includes a first section and a second section;

said first section of said contoured guide member includes a first end coupled to said first end mount and a second end mounted to said intermediate mount; and said second section of said contoured guide member includes a first end mounted to said intermediate mount and a second end mounted to said second end mount.

50. A vehicle according to claim 49, wherein each of said first and second sections of said contoured guide member includes a generally horizontal portion and an inclined portion.

51. A vehicle according to claim 47, wherein:

said support member includes two separate elongated members spaced apart from one another;

said rollers are mounted between said elongated members; and said intermediate mount facilitates the passage of said elongated members.

* * * * *